2,848,435
PROCESS FOR THE MANUFACTURE OF EPOXY RESINS

Leonard H. Griffin, Pasadena, and James H. Long, Houston, Tex., assignors to Shell Development Company, New York, N. Y., a corporation of Delaware No Drawing. Application March 28, 1955
Serial No. 497,426

10 Claims. (Cl. 260—47)

This invention relates to an improved process for the manufacture of epoxy resins—i. e., glycidyl ethers of polyhydric phenols.

Glycidyl ethers of polyhydric phenols have been prepared heretofore by etherifying a polyhydric phenol with epichlorohydrin in conjunction with sodium hydroxide to effect the reaction. Salt (NaCl) is a by-product of the etherification reaction. Since the glycidyl ethers are either very viscous liquids or solids at ordinary temperature, removal of this by-product salt from the resins has been a troublesome operation in large scale manufacture. Although the salt may be removed by washing the resin in molten condition with hot water, this procedure is very time consuming and difficult, especially with higher epoxy resins. Likewise, the known operation of adding an aromatic hydrocarbon such as benzene to the crude reaction product containing the ether and salt whereby the ether dissolves in the hydrocarbon, but the salt does not, and can be separated by filtration or water washing, is also most undesirable. Such a procedure suffers the time and expense of first having to dissolve the resin in the hydrocarbon to effect salt removal, and then later having to remove it from the resin.

The commercial need for a method of manufacturing the resins with means for efficient salt removal has been acute. For this purpose, it becomes evident that prior difficulties of salt removal could be overcome by effecting the etherification reaction in the presence of an inert solvent for the resin provided the resulting resin solution could be made to precipitate the salt for filtration removal or the solution is substantially immiscible with an aqueous brine solution. Salt could then be removed readily by water washing the crude resin solution. An intensive search by us among a host of apparently suitable solvents has demonstrated that only a particular type is operative in the process. In this search, we discovered that the requirements of the solvent are more complex than seems apparent. Thus, not only must the solvent be substantially inert against chemically combining with the reactants and products, as well as having the above noted solvency for the resin, but also, we found that it must display solvency for the sodium salts of the polyhydric phenol since otherwise the etherification reaction does not occur or is too slow for practical purposes. For example, upon attempting to effect the etherification reaction in the presence of an aromatic hydrocarbon such as xylene which is inert, is capable of dissolving resin and forms an ether solution that is immiscible with brine, we found that the reaction does not proceed because xylene is too poor a solvent for the sodium salt of the phenol. It appears that solvents for the glycidyl ether product are also powerful solvents for epichlorohydrin. In order for the etherification reaction to occur, it is essential that the sodium salt of the phenol be brought into solvated proximity with the epichlorohydrin, a condition which is possible only with substances that are also solvents for the sodium salt.

We have now discovered that efficient production of glycidyl ethers of polyhydric phenols is realized by etherifying polyhydric phenols with epichlorohydrin in conjunction with sodium hydroxide by effecting the reaction in the presence of an aliphatic secondary monohydric alcohol—i. e., an alkanol having the hydroxyl group linked directly to a secondary carbon atom. Our invention is thus the improved process of producing glycidyl ether of a polyhydric phenol which comprises reacting the polyhydric phenol with an alkali metal hydroxide and an epihalohydrin in the presence of a secondary aliphatic alcohol which is otherwise devoid of reactive groups. Particularly suited is an alkanol-2 of 3 to 8 carbon atoms. The process provides an efficient method for commercial manufacture of the glycidyl ethers since use of the secondary alcohols in the reaction mixture enables rapid ether formation with easy separation of by-product salt from the ether product. Furthermore, the obtained ether has desirably high epoxy content and contains a low amount of organically bound halogen. The process also has features permitting adaption to either batch or continuous production of epoxy resins, the latter being most important for cheap commercial manufacture of the resins on a large scale.

Prior to the present invention, it was known that ethers of polyhydric phenols could be prepared by reacting a polyhydric phenol with epichlorohydrin and sodium or potassium hydroxide in the presence of methyl or ethyl alcohol. However, use of these primary alcohols fails to give efficient production of proper ether products containing low chlorine content. Furthermore, use of these primary alcohols results in unduly large loss of epichlorohydrin to undesired byproducts such as ethyl glycidyl ether. It was therefore surprising to discover that use of the higher secondary alcohols not only gave ether products of proper chlorine content, but also, that formation of undesired byproducts was so much lower. These facts will be evident from the results of comparable use of the two types of alcohols given below.

A series of continuous runs using different alcohols was made by reaction of 2,2-bis(4-hydroxyphenyl)propane (bis-phenol) with sodium hydroxide and epichlorohydrin in a heated reaction vessel fitted with a stirrer and means for continuously introducing the reactants and alcohol while continuously withdrawing reaction product. All of the runs were made with continuous introduction of a 10:1 mole ratio of epichlorohydrin to bis-phenol, a 1:1 weight ratio of alcohol to epichlorohydrin, and a residence time in the reactor of 2 hours, the bis-phenol being added at a rate of 0.23 gram moles per liter of reaction space per hour. The sodium hydroxide was introduced as a 40% aqueous solution by weight at a rate which was substantially equivalent to the rate of introduction of the bis-phenol—i. e., about 2 moles of sodium hydroxide per mole of bis-phenol. The temperature of the reaction mixture was kept within the range of about 70 to 80° C. in all cases. The effluent reaction mixture was collected and the epoxy resin was separated from the other component parts. The results are tabulated below.

| Alcohol used | Ethyl | Isopropyl | sec-Butyl |
|---|---|---|---|
| Pounds resin obtained per pound bis-phenol fed | 1.39 | 1.47 | 1.46 |
| Moles epichlorohydrin converted to alcohol ether per mole epichlorohydrin reacted | 0.16 | 0.10 | 0.057 |
| Percent decrease in conversion of epichlorohydrin to alcohol ether as when ethyl alcohol used | | 38 | 63 |
| Resin properties: | | | |
| Epoxy value, equivalents per 100 g | 0.408 | 0.450 | 0.456 |
| Epoxide equivalent weight | 245 | 222 | 219 |
| Percent Chlorine | 2.25 | 1.32 | 0.91 |
| Viscosity, poises at 25° C | 255 | 231 | 232 |
| Molecular weight | 377 | 375 | 365 |

The foregoing results demonstrate that not only is the conversion of epichlorohydrin to by-product glycidyl ether of the alcohol markedly less when isopropyl or secondary butyl alcohol is used in place of ethyl alcohol, but also that more resin per weight of the phenol is obtained. Furthermore, the resulting resin has higher epoxy content and much lower chlorine content.

The unexpectedly favorable effect of a secondary alcohol, isopropyl alcohol, over that of the primary alcohol, ethyl alcohol, was confirmed in another pair of parallel runs employing a batch method of synthesis using solid sodium hydroxide. In each case, a solution was prepared containing by weight 456 parts (2 moles) of bis-phenol in 1850 parts (20 moles) of epichlorohydrin and 925 parts of the appropriate alcohol, ethyl or isopropyl. In reaction vessels fitted with a heater, stirrer and reflux apparatus, the solutions were stirred and heated to reflux temperature, and a total in each case of 173 parts of solid sodium hydroxide pellets was added in six equal portions at ten minute intervals while refluxing the reaction mixtures. Water formed in the reaction was next removed by distillation along with part of the unreacted epichlorohydrin and alcohol. Salt was separated from the substantially anhydrous residues by filtration, and then the remaining epichlorohydrin and ethyl or isopropyl alcohol were removed by distillation of the filtrates. The recovered epoxy resins were light colored viscous liquids in both instances. However, on the basis of epichlorohydrin consumed in obtaining the recovered epoxy resins, it was again found that the yield of resin based on the epichlorohydrin consumed—i. e., not recoverable as unreacted epichlorohydrin, was again improved by using the secondary alcohol, isopropyl alcohol, in place of ethyl alcohol. Thus, it was found that the quantity of obtained resin per unit weight of epichlorohydrin consumed when ethyl alcohol was used amounted to only 94.7% of that obtained when isopropyl alcohol was used. Furthermore, the viscosity of the resin obtained with use of isopropyl alcohol was 49 poises as compared to 68 poises (both at 25° C.) for the resin obtained with use of ethyl alcohol. The property of low viscosity is important in commercial utilization of the resins because of need for mobile fluidity in applying, using and curing the resins.

A variety of secondary alcohols are suited for use in the process. These include propanol-2, butanol-2, pentanol-2, pentanol-3, 3-methylbutanol-2, hexanol-2, hexanol-3, 4-methylpentanol-2, heptanol-2, heptanol-3, heptanol-4, 2,4-dimethylpentanol-3, octanol-2, 2-methylheptanol-2, 4-methylheptanol-2, 2,5-dimethylhexanol-3, 2-methylundecanol-3, 2-methylundecanol-5, dodecanol-2, tetradecanol-7, 9-methylpentadecanol-7, buten-3-ol-2, 3-methylbuten-3-ol-2, 4-methylpenten-3-ol-2, 2-methylhepten-6-ol-4, butin-3-ol-2 and pentin-1-ol-3. The secondary alcohols are aliphatic, are preferably liquids at 20° C., and contain the alcoholic hydroxyl group linked to a saturated secondary carbon atom while being otherwise devoid of reactive groups. Thus a compound such as 1,3-dichloropropanol-2 is unsuitable because of reactivity in the reaction mixture of the chlorine atoms therein. An alkanol-2 of 3 to 8 carbon atoms, particularly 4 to 6 carbon atoms, is preferred for use in the process. If desired, mixtures of the secondary alcohols may be used. A mixture of a secondary alcohol with another inert solvent for the resin such as an aromatic hydrocarbon or a halogenated hydrocarbon may also be used, it being preferred that the alcohol constitute at least 50% of the mixture.

The process of the invention is applicable for efficient production of glycidyl ether of any suitable polyhydric phenols. Typical phenols include resorcinol, hydroquinone, methyl resorcinol, chlorohydroquinone, phloroglucinol 1,5-dihydroxynaphthalene, 4,4'-dihydroxydiphenol, bis(4 - hydroxyphenyl)methane, 1,1 - bis(4 - hydroxyphenyl)ethane, 1,1-bis(4-hydroxyphenyl)isobutane, 2,2-bis(4-hydroxyphenol)propane which is termed bisphenol hereinafter for convenience, 2,2-bis(4-hydroxyphenyl)butane, 2,2 - bis(4-hydroxy-2-methylphenyl)propane, 2,2 - bis(2-hydroxy-4-tertiarybutylphenyl)propane, 2,2-bis(2-hydroxyphenyl)propane, 2,4'-dihydroxydiphenyldimethylmethane, 2,2 - bis(2 - chloro-4-hydroxyphenyl) propane, 2,2-bis(2-hydroxynaphthyl)pentane 2,2-bis(2,5-dibromo - 4-hydroxyphenyl)butane, 4,4'-dihydroxybenzophenone, 1,3-bis(4-hydroxyphenyloxy)-2-hydroxypropane, 3-hydroxyphenyl salicylate, 4-salicoylaminophenol, as well as more complex polyhydric phenols such as novolac resins obtainable by acid catalyzed condensation of phenol, p-cresol or other substituted phenols with aldehydes such as formaldehyde, acetaldehyde, crotonaldehyde, etc.; condensates of phenols with cardanol such as described in U. S. Patent 2,317,607; condensates of phenols with aliphatic diols such as described in U. S. Patent 2,321,620; and condensates of phenols with unsaturated fatty oils such as described in U. S. Patent 2,031,586. The polyhydric phenols contain 2 or more phenolic hydroxyl groups in the average molecule thereof and are free of other functional groups which would interfere with formation of the desired glycidyl ethers.

The process of the invention is effected by bringing together and reacting the polyhydric phenol with the epihalohydrin and alkali methal hydroxide in the presence of the secondary alcohol. More than an equivalent of the epihalohydrin is used in order that the product will be a glycidyl ether. By this is meant that more than 0.5 mole of epihalohydrin per phenolic hydroxyl equivalent weight of the phenol is used. Thus when a dihydric alcohol is etherified according to the process, more than 1 mole of epihalohydrin per mole of the phenol is used. Generally, there are used about 1.05 to 2 moles of epihalohydrin per mole of dihydric phenol to prepare the higher epoxy resins. As is known, these resins contain a chain of divalent aromatic radicals from the dihydric phenol, and aliphatic radicals from the epihalohydrin, with these two types of radicals alternating and being joined by ethereal oxygen atoms. The terminal groups of the polyethers are primarily glycidyl radicals. The length of the chain and the molecular weight is controlled by the proportion of halohydrin to phenol. As the mole ratio of epihalohydrin to phenol is decreased down from about two towards one, the length of the chain and the molecular weight increases. When it is desired to produce glycidyl ethers of lowest molecular weight from dihydric phenols or phenols containing three or more hydroxyl groups, it is preferred to use a substantial excess of epihalohydrin such as more than 2 moles per phenolic hydroxyl equivalent weight of the phenol. Although the excess may vary widely, good results are obtained using about 5 to 10 moles of epihalohydrin per phenolic hydroxyl equivalent weight of the phenol. Thus, in preparing glycidyl ether having low molecular weight from a dihydric phenol, a ratio of about 5 to 25 moles, preferably about 10 to 20 moles of epihalohydrin per mole of the dihydric phenol is used. Although it is preferred to use epichlorohydrin, other eiphalohydrins such as epibromohydrin can be used if desired.

In order to effect the etherification reaction, an alkali metal hydroxide is used in conjunction with the epihalohydrin. Sodium hydroxide is normally preferred although other alkali metal hydroxides such as potassium hydroxide may be employed. The amount of hydroxide used in the process is largely governed by the amount of epihalohydrin that reacts. Thus in etherifying a polyhydric phenol with use of an excess of more than two moles of epihalohydrin per phenolic hydroxyl equivalent weight of the phenol, there is used about a mole of the hydroxide per phenolic hydroxyl equivalent weight of the phenol. For example, preparation of glycidyl ether of a dihydric phenol with use of the excess of epihalohydrin is normally effected with use of about 1.8 to 2.5 moles, preferably about 2.1 to 2.3 moles, of the hydroxide per mole of the dihydric phenol. In reacting about 1.05 to 2 moles of epihalohydrin with a mole of dihydric phenol so as to form the higher epoxy resins, the hydroxide is used in amount of about 2 to 30% excess over the stoichiometric equivalent of the epihalohydrin, a mole of the hydroxide being considered as the stoichiometric equivalent of a mole of the epihalohydrin.

The alkali metal hydroxide may be brought together with the other reactants in any suitable manner. While solid hydroxide may be used, it is usually preferred to employ an aqueous solution such as one containing about 15 to 70% by weight of the hydroxide. Good results are obtained using about 20 to 45% by weight concentration of aqueous hydroxide solution. If desired, a solution or suspension of the hydroxide in the secondary alcohol may also be used.

The amount of alcohol used in the reaction mixture may vary widely with amounts depending largely upon the alcohol used and the epoxy resin being produced. In general, there is used about 10% to 500% by weight of that of the epihalohydrin employed. In forming lowest glycidyl ethers with use of the substantial excess of epihalohydrin, the alcohol is used in amount of about 20 to 200% of an equal weight of the epihalohydrin. On the other hand, when higher epoxy resins are prepared with use of say 1.05 to 2 moles of epihalohydrin per mole of dihydric phenol, the amount of alcohol employed is about 50 to 400% of an equal weight of the epihalohydrin.

Although various procedures may be employed in bringing the three reactants together, it is generally preferred to dissolve the polyhydric phenol in the epihalohydrin and alcohol, and then to add the hydroxide to the solution. The etherification reactions occur while agitating and heating the mixture at about 40 to 150° C., preferably about 60 to 100° C. The reactions occur in the liquid phase and it may therefore be necessary to employ superatmospheric pressure in operating at higher temperatures which are above the normal boiling temperature of the reaction mixture. With alcohols having reasonably high boiling points such as methyl isobutyl carbinol, it is convenient simply to reflux the reaction mixture in order to regulate the temperature.

In applying the process of the invention to production of higher epoxide resins, an aqueous solution of alkali metal hydroxide is added to a solution containing a mole of dihydric phenol in about 1.05 to 2 moles of epihalohydrin and an alkanol-2 of 3 to 8 carbon atoms in amount of about 50 to 400% of an equal weight of the halohydrin while heating and agitating the mixture to thereby effect the etherification reactions. Upon completion of the addition and the reactions the product mixture is allowed to stratify into an aqueous brine phase and an organic resin-containing phase. All of the epihalohydrin has reacted in this case. The two phases are separated. Any unreacted hydroxide in the organic phase is neutralized by contacting and agitating with a dilute aqueous solution of a weak acid such as acetic acid or sodium di- or mono-hydrogen phosphate. The mixture is again permitted to phase and the aqueous layer is separated. Some water may be contained in the organic layer, the amount being increasingly less as more carbon atoms are contained in the secondary alcohol. The water in the phase enables some salts to remain therein. When the alcohol is say butanol-2, it is best to dehydrate the organic phase by distillation which azeotropically removes the water. The remaining mixture can then be filtered or centrifuged to remove residual salts. When a higher alcohol is used such as 4-methylpentanol-2, the organic phase can adequately be freed of salts by simple water washing followed by distillation to separate residual water and the alcohol from the epoxy resin.

In applying the process to production of lower glycidyl ethers wherein the substantial excess of epihalohydrin is used and unreacted halohydrin remains in the reaction mixture after the etherification reactions, a somewhat different procedure is desirably followed. For example, by reacting a dihydric phenol with epichlorohydrin using a mole ratio of about 15:1 of chlorohydrin to phenol, and propanol-2 as the reaction solvent in amount of about 25% of the weight of the chlorohydrin, it is desirable to add as little water along with sodium hydroxide as is convenient. This may be realized by adding the hydroxide as a 70% aqueous solution which may be pumped into the reaction mixture while hot. Having only a small amount of water in the reaction mixture causes the formed salt to precipitate from the crude reaction product so that it may readily be separated by settling, centrifugation and/or filtration. The resin solution is then subjected to distillation for removal of the alcohol, unreacted epichlorohydrin and water, the residue being the desired glycidyl ether.

The invention is illustrated by the following examples, but it is not to be construed as limited to details described therein. The parts and percentages are by weight.

Example 1

To a reaction vessel fitted with a heater, stirrer and condenser, 1009 parts of secondary butyl alcohol, 191 parts of epichlorohydrin and 300 parts of bis-phenol were added. The solution was heated with stirring to about 50° C. and then 90.9 parts parts of sodium hydroxide as a 20% aqueous solution was added. The temperature was then increased so that the stirred mixture boiled and refluxing occurred in 30 minutes, and the refluxing was continued for another 30 minutes. At the end of this time, the stirring was discontinued and the mixture was allowed to separate into two phases. The aqueous layer was withdrawn, and the upper organic layer was mixed and neutralized with 25 parts of sodium dihydrogen phosphate as a 25% aqueous solution. The mixture was again allowed to phase and the aqueous layer was removed. The solvent layer was dehydrated by flash distillation therefrom the alcohol-water azeotrope, followed by filtering to remove the last traces of salt, and distilled to remove the alcohol. The resulting resin obtained in amount of 382 parts had an epoxide equivalent weight of 470 and a Durrans' mercury method melting point of 68° C.

Example 2

Another resin was prepared in the same manner using 808 parts of secondary butyl alcohol, 196 parts of epichlorohydrin, 300 parts of bis-phenol and 94 parts of sodium hydroxide as a 20% aqueous solution. The obtained resin had an epoxide equivalent weight of 949 and a Durrans melting point of 103° C.

Example 3

Still another resin was similarly prepared using 1212 parts of secondary butyl alcohol, 133.8 parts of epichlorohydrin, 300 parts of bis-phenol and 70.6 parts of sodium hydroxide, as a 22% aqueous solution. The resin had an epoxide equivalent weight of 1609 and a Durrans melting point of 117° C.

Example 4

This run was made as described above except that a mixture of equal weights of secondary butyl alcohol and toluene was used as solvent in reacting 70.6 parts of sodium hydroxide (22% aqueous solution) with 386 parts of bis-phenol and 191 parts of epichlorohydrin. The resin had an epoxide equivalent weight of 982 and a Durrans melting point of 89° C.

Example 5

Methyl isobutyl carbinol was used as solvent in this run. About 94 parts of sodium hydroxide as a 45% aqueous solution was added to a warmed and stirred solution containing 300 parts of bis-phenol, 196 parts of epichlorohydrin and 403 parts of methyl isobutyl carbinol, and while agitating, the mixture was brought up to reflux temperature in 30 minutes and maintained at this temperature for another 30 minutes. The stirring was stopped and the aqueous layer was separated. The organic layer was then mixed and agitated with 25 parts of sodium dihydrogen phosphate (25% aqueous solution) and separated from the aqueous layer. The organic layer was next washed with water to remove residual salt and then was subjected to distillation for removal of a small amount of water and the alcohol. The resin had an epoxide equivalent weight of 514, contained only 0.27% of chlorine, and had a Durrans melting point of 72° C.

*Example 6*

Methyl isobutyl carbinol was again employed as described above using 806 parts of the carbinol, 300 parts of bis-phenol, 148.5 parts of epichlorohydrin and 70.7 parts of sodium hydroxide as a 45% aqueous solution. The resin had an epoxide equivalent weight of 875 and a Durrans melting point of 95° C.

*Example 7*

Bis-phenol was reacted with epichlorohydrin and caustic in the presence of isopropyl alcohol in continuous fashion using a reactor consisting of a vertical column divided into eight interconnected compartments, each containing a paddle stirrer driven by a common shaft. A solution containing epichlorohydrin and bis-phenol in a mole ratio of 15:1 along with isopropyl alcohol in a weight ratio of 1:4 with the epichlorohydrin was continuously fed to the bottom of the reactor, flow being upwards therein. Sodium hydroxide as a 45% aqueous solution was continuously introduced in the seventh compartment. The sodium hydroxide was fed at a rate of 2.2 moles per mole of bis-phenol introduced. The reaction was effected at a temperature of 80 to 84° C. Salt appeared as crystals which settled to the bottom of the reactor as a slurry carrying most of the water. The salt slurry was removed intermittently. The supernatant discharge from the reactor was distilled to remove the remaining water, epichlorohydrin, isopropyl alcohol, and other volatiles from the resin. The resulting resin was a liquid having a viscosity of 146 poises at 25° C., a chlorine content of 0.53%, and an epoxide equivalent weight of 204.

*Example 8*

Bis-phenol was again reacted in continuous fashion with epichlorohydrin and caustic alkali in the presence of isopropyl alcohol as described in Example 7 except that a mole ratio of epichlorohydrin to bis-phenol of 20:1 was used, and the aqueous sodium hydroxide was split into three equal streams with introduction continuously into the fifth, sixth and seventh compartments of the reactor. The obtained resin was a liquid having a viscosity of 103 poises at 25° C., a chlorine content of 0.75%, and an epoxide equivalent weight of 206.

*Example 9*

Bis-phenol was reacted with epichlorohydrin and solid (substantially anhydrous) caustic using isopropyl alcohol in the reaction medium. A charge of bis-phenol dissolved in a mixture of equal weights of epichlorohydrin and isopropyl alcohol, the bis-phenol being present in a mole ratio of 1:9 with the epichlorohydrin, was placed in a reaction vessel fitted with a heater, stirrer and reflux apparatus. The solution was stirred and heated to reflux temperature of about 85° C. and a total of 2.2 moles of solid sodium hydroxide pellets per mole of the bis-phenol was added in six portions at ten minute intervals while refluxing the reaction mixture. Water formed in the reaction was next removed by distillation along with part of the unreacted epichlorohydrin and alcohol. Salt was removed from the substantially anhydrous residue by filtration and then the remaining epichlorohydrin and isopropyl alcohol were removed by distillation of the filtrate to a temperature of 150° C. under a pressure of 50 mm. Hg for one-half hour. The resulting liquid resin had a Durrans melting point of 9° C., a chlorine content of 0.47% and an epoxide equivalent weight of 190.

*Example 10*

The run described in Example 8 was repeated except that a mole ratio of 9:1 of epichlorohydrin to bis-phenol, and a weight ratio of 3:1 of isopropyl alcohol to the chlorohydrin were used. The resulting liquid resin had a Durrans melting point of 11° C., a chlorine content of 0.44%, and an epoxide equivalent weight of 197.

*Example 11*

A run as described in Example 8 was conducted with use of a mole ratio of epichlorohydrin to bis-phenol of 10:1 and a weight ratio of isopropyl alcohol to epichlorohydrin of 0.5:1. The resulting liquid resin had a Durrans melting point of 11° C., a chlorine content of 0.38% and an epoxide equivalent weight of 190.

*Example 12*

Another run was made as described in Example 8 except that the sodium hydroxide as a 50% by weight aqueous solution was added continuously during an hour's time to the reaction mixture. Since water was introduced with the added hydroxide, distillation of a larger proportion of the epichlorohydrin and alcohol from the crude reaction product to dehydrate it was necessary. The salt was then separated by filtration followed by distillation of the remaining chlorohydrin and alcohol from the filtrate. The resulting liquid resin had a Durrans melting point of 11° C., a chlorine content of 0.6%, and an epoxide equivalent weight of 200.

We claim as our invention:

1. A process for the production of glycidyl ether of a polyhydric phenol which comprises reacting a polyhydric phenol the sodium and potassium salts of which are soluble in the hereinafter described secondary alcohol with more than 0.5 mole of epihalohydrin per phenolic hydroxyl equivalent weight of the said polyhydric phenol and an alkali metal hydroxide of the group consisting of sodium and potassium hydroxide in the presence of an aliphatic secondary monohydric alcohol selected from the group consisting of isopropyl alcohol, 2-butanol and methyl isobutyl carbinol.

2. A process for the production of glycidyl ether of a dihydric phenol the sodium salt of which is soluble in the hereinafter described alkanol which comprises mixing and reacting a mole of the dihydric phenol with sodium hydroxide and more than a mole of epichlorohydrin in the presence of an alkanol of the group consisting of isopropyl alcohol, 2-butanol and methyl isobutyl carbinol, the amount of alkanol being from about 10% to 500% by weight of that of the epichlorohydrin.

3. A process for the production of glycidyl ether of 2,2-bis(4-hydroxyphenyl)propane which comprises mixing about 1.8 to 2.5 moles of sodium hydroxide with a solution containing a mole of the phenol, about 5 to 25 moles of epichlorohydrin and an alkanol of the group consisting of isopropyl alcohol, 2-butanol and methyl isobutyl carbinol in amount of about 20 to 200% of an equal weight of the epichlorohydrin, the mixture being agitated and heated in liquid phase at about 40 to 150° C.

4. A process for the production of glycidyl ether of 2,2-bis(4-hydroxyphenyl)propane which comprises mixing about 2.1 to 2.3 moles of sodium hydroxide as about a 30 to 70% by weight aqueous solution with a solution containing a mole of the phenol, about 10 to 20 moles of epichlorohydrin and isopropyl alcohol in amount of about 20 to 200% of an equal weight of the epichlorohydrin, the mixture being agitated and heated in liquid phase at about 60 to 100° C. to effect the etherification reactions.

5. A process for the production of an epoxy resin which comprises adding an aqueous solution of sodium hydroxide to a solution containing a mole of dihydric phenol the sodium salt of which is soluble in the hereinafter described alkanol, about 1.05 to 2 moles of epichlorohydrin, and an alkanol of the group consisting of isopropyl alcohol, 2-butanol and methyl isobutyl carbinol in amount of about 50 to 400% of an equal weight of the epichlorohydrin while heating and agitating the mixture at from about 40° C. to boiling temperature to thereby effect the etherification reactions, the hydroxide being added in amount of about 2 to 30% excess over the stoichiometric equivalent of the epichlorohydrin.

6. A process as defined in claim 5 wherein the dihydric phenol is 2,2-bis(4-hydroxyphenyl)propane, and the alkanol is butanol-2.

7. A process as defined in claim 5 wherein the dihydric phenol is 2,2-bis(4-hydroxyphenyl)propane and the alkanol is methyl isobutyl carbinol.

8. A process for the production of an epoxy resin which comprises mixing sodium hydroxide as about a 15 to 70% by weight aqueous solution to a solution containing a mole of dihydric phenol the sodium salt of which is soluble in the hereinafter described alkanol-2, about 1.05 to 2 moles of epichlorohydrin and an amount of an alkanol-2 of 3 to 8 carbon atoms about equal to 50 to 400% of the weight of the epichlorohydrin while heating and agitating the reaction mixture within the range of from about 40° C. to boiling temperature so as to thereby effect the etherification reactions, the hydroxide being added in amount of about 2 to 30% excess over the stoichiometric equivalent of the epichlorohydrin; next allowing the reaction mixture to stratify into an aqueous phase and an organic resin-containing phase and separating the two phases; and then removing any remaining hydroxide, water and said alkanol-2 from the resin-containing phase so as to recover the epoxy resin therefrom.

9. A process as defined in claim 8 wherein the dihydric phenol is 2,2-bis(4-hydroxyphenyl)propane, and the alkanol is butanol-2.

10. A process as defined in claim 8 wherein the dihydric phenol is 2,2-bis(4-hydroxyphenyl)propane, and the alkanol is methyl isobutyl carbinol.

References Cited in the file of this patent

UNITED STATES PATENTS

| | | |
|---|---|---|
| 2,567,842 | Erickson | Sept. 11, 1951 |
| 2,581,464 | Zech | Jan. 8, 1952 |
| 2,659,710 | Martin | Nov. 17, 1953 |
| 2,665,266 | Wasserman | Jan. 5, 1954 |
| 2,742,448 | Beacham et al. | Apr. 17, 1956 |
| 2,752,269 | Condo et al. | June 26, 1956 |